(12) United States Patent
Simpson et al.

(10) Patent No.: US 9,059,816 B1
(45) Date of Patent: Jun. 16, 2015

(54) CONTROL LOOP MANAGEMENT AND DIFFERENTIAL DELAY CORRECTION FOR VECTOR SIGNALING CODE COMMUNICATIONS LINKS

(71) Applicant: Kandou Labs S.A., Lausanne (CH)

(72) Inventors: Richard Simpson, Bedford (GB); Roger Ulrich, Bern (CH)

(73) Assignee: KANDOU LABS, S.A. (CH)

( * ) Notice: Subject to any disclaimer, the term of this patent is extended or adjusted under 35 U.S.C. 154(b) by 52 days.

(21) Appl. No.: 13/839,094

(22) Filed: Mar. 15, 2013

(51) Int. Cl.
*H04L 25/60* (2006.01)
*H04L 1/00* (2006.01)

(52) U.S. Cl.
CPC .................................... *H04L 1/0001* (2013.01)

(58) Field of Classification Search
CPC .......... H04B 17/00; H04B 3/46; H04L 43/00; H04L 1/24; H04L 12/26; H04L 1/00
USPC ........................... 375/224, 340, 316, 341, 260
See application file for complete search history.

(56) References Cited

U.S. PATENT DOCUMENTS

| | | | |
|---|---|---|---|
| 5,809,430 A * | 9/1998 | D'Amico | 455/525 |
| 6,509,773 B2 | 1/2003 | Buchwald et al. | |
| 8,539,318 B2 | 9/2013 | Cronie et al. | |
| 8,601,338 B2 * | 12/2013 | Kolze | 714/752 |
| 2008/0086670 A1 * | 4/2008 | Krouk et al. | 714/752 |
| 2009/0238303 A1 * | 9/2009 | Mondal et al. | 375/295 |
| 2011/0268225 A1 | 11/2011 | Cronie | |

* cited by examiner

*Primary Examiner* — Emmanuel Bayard
(74) *Attorney, Agent, or Firm* — Invention Mine LLC (57) ABSTRACT

Vector signaling code communications systems rely on group transmission of code symbols using multiple signaling channels that may have differing propagation characteristics, resulting in differing received signal levels, waveforms, and symbol arrival times, and thus that should be actively monitored and adjusted to minimize differential signal characteristics. Information obtained during symbol decode may be analyzed to identify channel operational characteristics during normal operation and perform non-disruptive channel adjustments, including per-channel adjustment of sample-and-hold timing to realign code symbol groups. Initialization or start-up adjustment may also be performed using intentionally-transmitted training patterns.

16 Claims, 8 Drawing Sheets

CONTROL LOOP MANAGEMENT AND DIFFERENTIAL DELAY CORRECTION FOR VECTOR SIGNALING CODE COMMUNICATIONS LINKS

CROSS-REFERENCES TO RELATED APPLICATIONS

The following prior applications are herein incorporated by reference in their entirety for all purposes:

U.S. Patent Publication 2011/0268225 of application Ser. No. 12/784,414, filed May 20, 2010, naming Harm Cronie and Amin Shokrollahi, entitled "Orthogonal Differential Vector Signaling" (hereinafter "Cronie I").

U.S. Patent Publication 2011/0302478 of application Ser. No. 12/982,777, filed Dec. 30, 2010, naming Harm Cronie and Amin Shokrollahi, entitled "Power and Pin Efficient Chip-to-Chip Communications with Common-Mode Resilience and SSO Resilience" (hereinafter "Cronie II").

U.S. patent application Ser. No. 13/030,027, filed Feb. 17, 2011, naming Harm Cronie, Amin Shokrollahi and Armin Tajalli, entitled "Methods and Systems for Noise Resilient, Pin-Efficient and Low Power Communications with Sparse Signaling Codes" (hereinafter "Cronie III").

U.S. patent application Ser. No. 13/176,657, filed Jul. 5, 2011, naming Harm Cronie and Amin Shokrollahi, entitled "Methods and Systems for Low-power and Pin-efficient Communications with Superposition Signaling Codes" (hereinafter "Cronie IV").

U.S. Patent Application 61/697,540, filed Sep. 6, 2012, naming Harm Cronie and Brian Holden, entitled "Sorting Decoder" (hereafter called "Cronie V").

U.S. patent application Ser. No. 13/542,599, filed Jul. 5, 2012, naming Armin Tajalli, Harm Cronie, and Amin Shokrollahi entitled "Methods and Circuits for Efficient Processing and Detection of Balanced Codes" (hereafter called "Tajalli I").

The following additional reference to prior art has been cited in this application:

[Buchwaldl] U.S. Pat. No. 6,509,773, filed Apr. 30, 2001 by Buchwald et al., entitled "Phase interpolator device and method."

FIELD OF THE INVENTION

The present invention relates to communications systems circuits generally, and more particularly to the configuration, control, and management of high-speed multi-wire serial interfaces used for chip-to-chip communication, including compensation of differential propagation delay.

BACKGROUND

In modern digital systems, digital information has to be processed in a reliable and efficient way. In this context, digital information is to be understood as information available in discrete, i.e., discontinuous values. Bits, collection of bits, but also numbers from a finite set can be used to represent digital information.

In most chip-to-chip, or device-to-device communication systems, communication takes place over a plurality of wires to increase the aggregate bandwidth. A single or pair of these wires may be referred to as a channel or link and multiple channels create a communication bus between the electronic components. At the physical circuitry level, in chip-to-chip communication systems, buses are typically made of electrical conductors in the package between chips and mother-boards, on printed circuit boards ("PCBs") boards or in cables and connectors between PCBs. In high frequency applications, microstrip or stripline PCB traces may be used.

Common methods for transmitting signals over bus wires include single-ended and differential signaling methods. In applications requiring high speed communications, those methods can be further optimized in terms of power consumption and pin-efficiency, especially in high-speed communications. More recently, vector signaling methods have been proposed to further optimize the trade-offs between power consumption, pin efficiency and noise robustness of chip-to-chip communication systems. In those vector signaling systems, the digital information is transformed into a different representation space in the form of a vector codeword that is chosen in order to optimize the power consumption, pin-efficiency and speed trade-offs based on the transmission channel properties and communication system design constraints. Herein, this process is referred to as "encoding".

At the receiver side, the received signals corresponding to the codeword are transformed back into the original digital information representation space. Herein, this process is referred to as "decoding".

Figure 1:
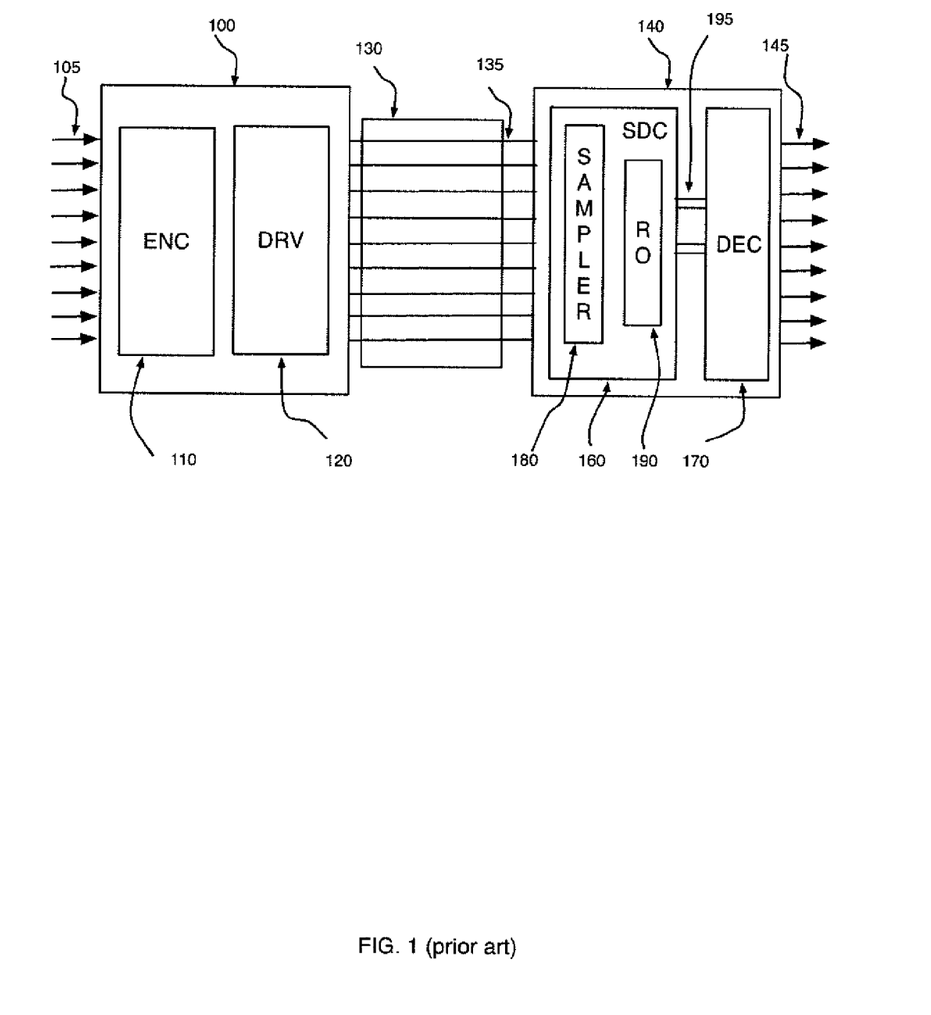
FIG. 1 is a block diagram of a prior art communications system.

FIG. 1 represents a high-level block diagram of such a prior art communication system. At the transmit unit 100 side of the communication system, an encoder 110 transforms a sequence of k information symbols 105 into a vector codeword CW. A driver 120 maps vector codeword CW into a set of physical signals and transmits them on the n wires 135 of bus 130. Although FIG. 1 shows a number of lines for the k information symbols 105 and a number of wires 135, it should be understood that different values for k and n could be used and they need not be equal.

At the other side of bus 130, a receive unit 140 maps the n received physical signals from wires 135 back into k information symbols 145. Receive unit 140 comprises a bus receiver in the form of a signal-to-digital converter ("SDC") 160 and a vector codeword decoder ("DEC") 170. In FIG. 1, a task of the SDC 160 is to reconstruct an estimate of the transmitted vector codeword CW from the analog signals transmitted and recorded over the n bus wires 135. SDC 160 then transmits the estimate of vector codeword CW to codeword decoder 170. Codeword decoder 170 can then reconstruct the k output bits by applying the reverse transformation from that of transmit encoder 110. SDC 160 is shown comprising a sampler 180 and a rank-order unit 190.

As an example, bus 130 might be a bus between a processor and memory. In that case, the physical wires may take the form of striplines or microstrips on a PCB. Another example of bus 130 might be a set of wires connecting two different devices.

BRIEF SUMMARY OF THE INVENTION

High speed communications interfaces comprising multiple independent channels operating as a group introduce new operational issues not seen in single-circuit links. Beyond the usual requirements of clock recovery, data framing, and channel equalization, inter-channel effects such as differential link gain and differential link delay should also be addressed to insure that the signals received on all channels may be combined to accurately reproduce at the receiver the group-encoded symbols sent by the transmitter.

Methods are described to adjust channel receive characteristics to optimize data transfer, both as a link initialization procedure using known training sequences, and as a dynamic adjustment process performed during normal data transmission.

BRIEF DESCRIPTION OF THE DRAWINGS

FIG. 2 is a block diagram of a vector signal code receiver for an exemplary eight-channel link in accordance with at least one embodiment of the invention; FIG. 2A illustrates one channel's elements, while

DETAILED DESCRIPTION OF THE INVENTION

As described in Cronie I, Cronie II, Cronie III and Cronie IV, vector signaling codes may be used to produce extremely high bandwidth data communications links, such as between two integrated circuit devices in a system. Multiple data communications channels transmit symbols of the vector signaling code, acting together to communicate codewords of the vector signaling code. Thus, proper operation of the communications interface requires two levels of operational management and control: adjustment of each individual channel so as to accurately communicate individual symbols, and coordination across all channels so as to deliver coherent codewords of the vector signaling code for decoding.

Depending on the particular vector signaling code used, the number of channels comprising a communications link may range from two to eight or more. Individual symbols, e.g., transmissions on any single communications channel, may utilize multiple signal levels, often three or more. Operation at channel rates exceeding 10 Gbps may further complicate receive behavior by requiring deeply pipelined or parallelized signal processing, precluding reception methods that require the previous received value to be known as the current value is being received.

Embodiments described herein can also be applied to prior art permutation sorting methods not covered by the vector processing methods of Cronie II, Cronie III, Cronie IV, and/or Cronie V. More generally, embodiments of the present invention can apply to communication or storage methods requiring coordination of multiple channels or elements of the channel to produce a coherent aggregate result.

Vector Processing Background

In this disclosure, the methods disclosed in Cronie II, Cronie III, and Cronie IV are collectively described as "vector processing" methods, including permutation modulation codes as in Cronie III and sparse signaling codes as in Cronie IV. A permutation modulation code or sparse signaling code $CW_i$ is defined by a basis vector, $x_0$, where the code consists of all permutations of $x_0$.

A common theme in vector processing methods is that permutation modulation methods are most efficiently decoded by integrating a sorting decoder at the communication receiver, as illustrated as 160 in FIG. 1, where a rank-order unit 190 sorts the input signals according to their ranking, that is, an indication of the relative ranks of each input signal compared to the others. This ranking uniquely determines the interpretation of input signals as symbols of the permutation modulation code, and thus the decoding of the underlying codeword associated with the analog signals transmitted over bus 130. Another embodiment utilizes digital comparators that directly compare the signal differences between each pair of input signal wires, prior to the sorting or rank-ordering operation.

The rank-order sorting operation may determine a full ordering of the sampled values on the wires or a partial order. A full ordering would mean that all values on the n wires are sorted. A partial ordering would mean that only a subset of the wires are determined that carry some of the largest and some of the smallest values, which is enough when the other values are non-quiescent, in particular in the case of a sparse modulation code. For purposes of explanation, the following descriptions assume the sampled values are ordered from a most positive or "highest" value, to a most negative or "lowest" value, where values representing "+1" symbols are higher than those representing "0" which are in turn higher than those representing "−1". In practice, these values may span positive and negative signal voltages including zero, or may be exclusively positive or exclusively negative signal voltage values.

Possible detailed embodiments of rank-order units 190 and codeword decoder 170 have been taught in Cronie III. For instance, in some embodiments, rank-order units 190 may further comprise a max-detector unit to select the highest (positive) values and a min-detector unit to select the lowest (negative) values out of the n components of the sampled y vector signal.

An example of a sampled vector signal may be as shown by Equation 1, where the largest value 1.2 is detected on wire 8, the second largest value 1.1 is detected on wire 1, the smallest value −1.3 is detected on wire 3 and the second smallest value is detected on wire 5. The remaining elements are treated as corresponding to "0" elements.

$$y=[1.1\ 0.2\ -1.3\ 0.19\ -0.9\ 0.01\ -0.3\ 1.2] \quad\text{(Eqn. 1)}$$

Codeword decoder 170 can then reconstruct the original vector $CW_i$ as in Equation 2.

$$CW_i=[+1\ 0\ -1\ 0\ -1\ 0\ 0+1] \quad\text{(Eqn. 2)}$$

Codeword decoder 170 can then further reconstruct the k output bits 145 by mapping back vector $CW_i$ into the initial representation space, by applying the reverse operation of encoder 110.

Example Receiver Architecture

For purposes of description, one example embodiment of the receiver component of a vector signaling code communications architecture in accordance with the invention is illustrated in FIG. 2, utilizing codewords of eight symbols carried by printed circuit board traces or striplines from a transmitting integrated circuit chip to a receiving integrated circuit chip. Following well-known best practices, the individual signal lines comprising the communications link are routed with minimal bends, vias, or other transmission line impedance anomalies and have identical signal path lengths, with the intent of producing identical signal characteristics and transmission delays. However, it is known that manufacturing variations including printed circuit board chemical composition, layer spacing, and trace width variation can affect both trace or stripline impedance and delay characteristics. Moreover, external factors such as adjacent metallic or dielectric objects, as well as ambient temperature and humidity are also known to influence signal line characteristics.

Figure 2A:
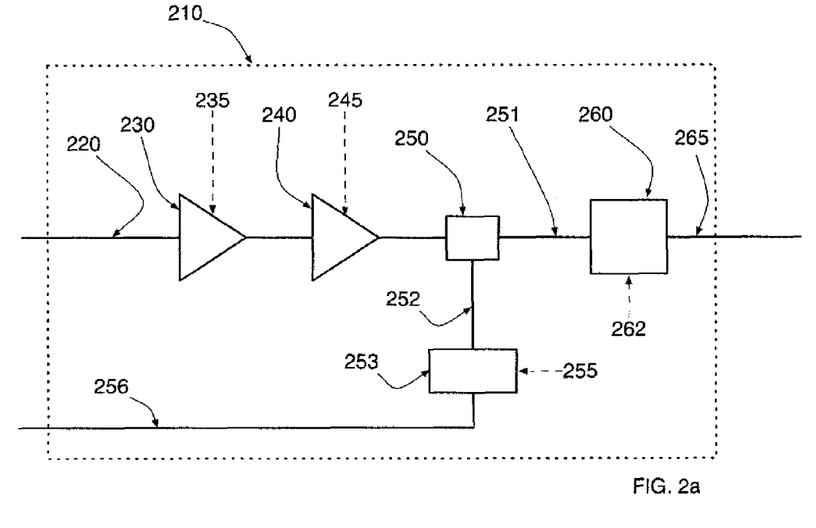

Thus, multiwire bus design rules adequate to support Megahertz signaling rates and simple differential links may be found to be insufficient at Gigahertz speeds and wider communications channels, requiring the introduction of active equalization to provide adequate signal edge definition, and skew control to compensate for differential delay characteristics among the channels. A separate receive channel circuit 210 is provided for each receive signal line comprising the vector signaling code communications link, as shown in FIG. 2A. A channel's receive signal line 220 is terminated at receive amplifier 230 which can compensate for overall signal strength loss over the transmission path. A separate line equalizer 240 is shown, although some embodiments may integrate the functions 230 and 240.

The equalizer provides compensation for frequency-dependent channel loss characteristics; some embodiments perform an equivalent operation in the time domain, as with a Decision Feedback Equalization circuit. Receive signal voltage characteristics such as gain and/or offset voltage may be adjusted using receive amplifier adjustments 235, and line equalization characteristics may be adjusted using equalization adjustments 245. A sample-and-hold circuit 250 is used to produce a stable signal level on the sampled signal 251 during the signal amplitude measurement operation, here shown as a signal-to-time converter 260 calibrated using converter controls 262 to produce digital output 265. The timing of the sample operation is controlled by channel sampling clock 252, which is derived by channel phase interpolator 253 from the symbol-rate receive clock 256 under control of channel phase adjustment 255.

Figure 2B:
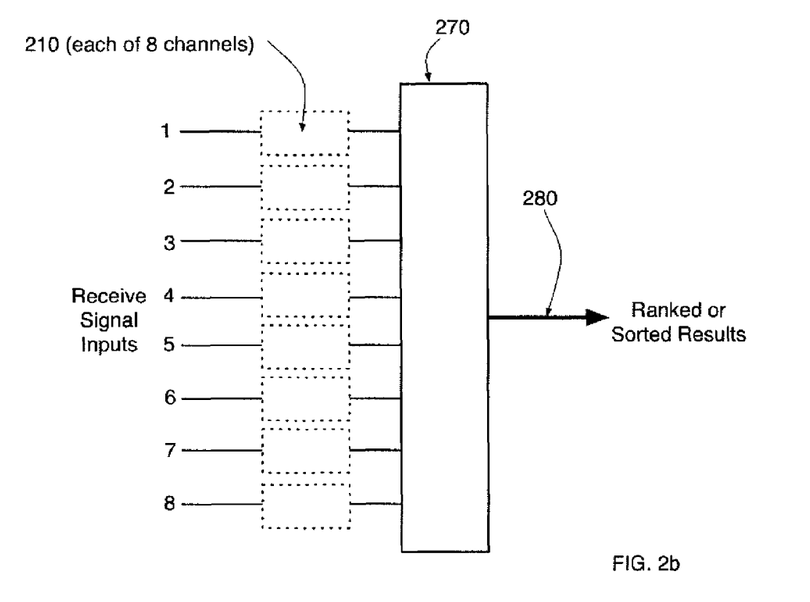
FIG. 2B illustrates the eight channels at a higher level of detail.

As illustrated in FIG. 2B, the output of each receive channel circuit 210 is input to a ranking or sorting circuit 270, which produces a ranked or sorted result 280 identifying the inputs in order of signal amplitude. The ranked or sorted results are subsequently processed, first by being categorized as symbol elements of the vector signaling codeword, then by decoding the codeword to recreate the originally transmitted data.

A track-and-hold circuit with an output that is not used in further processing until its hold step can be used in place of the described sample-and-hold circuit.

Multiphase Receive Processing

Figure 7:
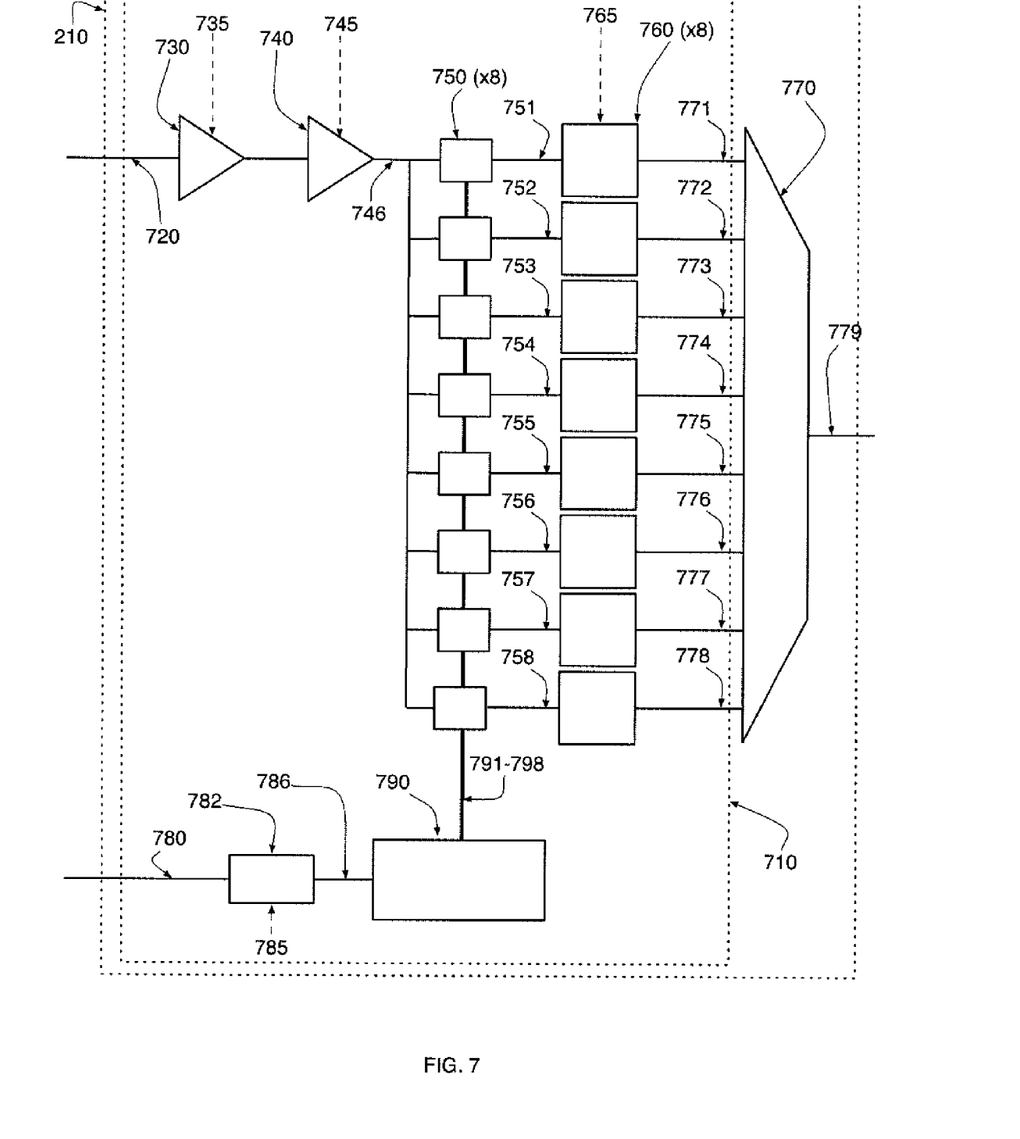
FIG. 7 is a block diagram of a vector signal code receiver for the exemplary eight-channel link utilizing an example eight phases of processing, in accordance with at least one embodiment of the invention.

At least one embodiment in accordance with the invention incorporates multiple phases of receive processing operating in parallel, each such phase or slice of receive processing having its own sample-and-hold stage. Thus, each individual phase is allowed additional processing time, effectively operating at a fraction of the overall data rate, the overall set of phases accept input at full rate and deliver results at full rate. A block diagram of this embodiment is shown in FIG. 7 with an example eight phases of parallel processing. Extension to fewer or greater number of phases will be readily apparent to a practitioner of the art upon review of this disclosure.

Each phase of processing as shown in FIG. 7 performs the necessary processing steps for one bit time, with processing of multiple consecutive symbol times being performed in parallel by the multiple phases. Thus, in this example eight consecutive symbol times are simultaneously being processed as eight processing phases within single receive channel 210. As with the single-phase embodiment of FIG. 2, the multiphase embodiment's receive signal line 720 is terminated at receive amplifier 730 which can compensate for overall signal strength loss over the transmission path. A separate line equalizer 740 is shown, although some embodiments may integrate the functions 730 and 740. The equalizer provides compensation for frequency-dependent channel loss characteristics; some embodiments perform an equivalent operation in the time domain, as with a Decision Feedback Equalization circuit. Receive signal voltage characteristics such as gain and/or offset voltage may be adjusted using receive amplifier adjustments 735, and line equalization characteristics may be adjusted using equalization adjustments 745.

One sample-and-hold circuit 750 is used per processing phase (thus, in this example eight such circuits are used) to produce stable signal levels to be processed by the remainder of the circuits of that phase. In this example, the input to each sample-and-hold 750 is captured under control of one of sampling clock phases 791 through 798, producing the resulting stable signal levels 751 through 758, which are subsequently processed within each phase.

The timing of the eight sample operations are controlled by channel phase sampling clocks 791 through 798, which are derived using phase selector 790 from the channel sampling clock 786 output by channel phase interpolator 782 from the symbol-rate receive clock 780 under control of channel phase adjustment 785. Phase selector 790 divides the symbol-rate clock 780 by the number of phases, here eight, and directs an appropriate sampling clock signal to each phase in turn. As one example, phase selector 790 is a "one hot output" divide by eight counter producing eight non-overlapping channel phase sampling clock outputs, each at one eighth of the input clock rate and each controlling a separate instance of 750. It should be noted that phase interpolator 782 will thus adjust sample timing for each receive symbol identically, regardless of which particular processing phase is used.

In FIG. 7, the subsequent processing of the phase sampled stable signal levels 751 through 758 are shown as the eight (one per phase) signal-to-time converters 760 calibrated using converter controls 765 to produce digital outputs 771 through 778. These digital outputs may be combined using the illustrated multiplexor 770 to produce a single full-rate digital output 779. Thus, in at least one embodiment of the invention the entire subcircuit 210 of FIG. 7 with its multiple processing phases is incorporated as each subcircuit 210 of FIG. 2B.

In some embodiments of the invention, phased processing continues using digital outputs 771 through 778 so as to include phased processing of subsequent processing steps, such as channel ranking or sorting. Thus, in such embodiments, the FIG. 7 representation of each channel's analog processing subcircuit is best illustrated as 710, incorporating one channel receive input and one digital result output per processing phase.

Figure 8:
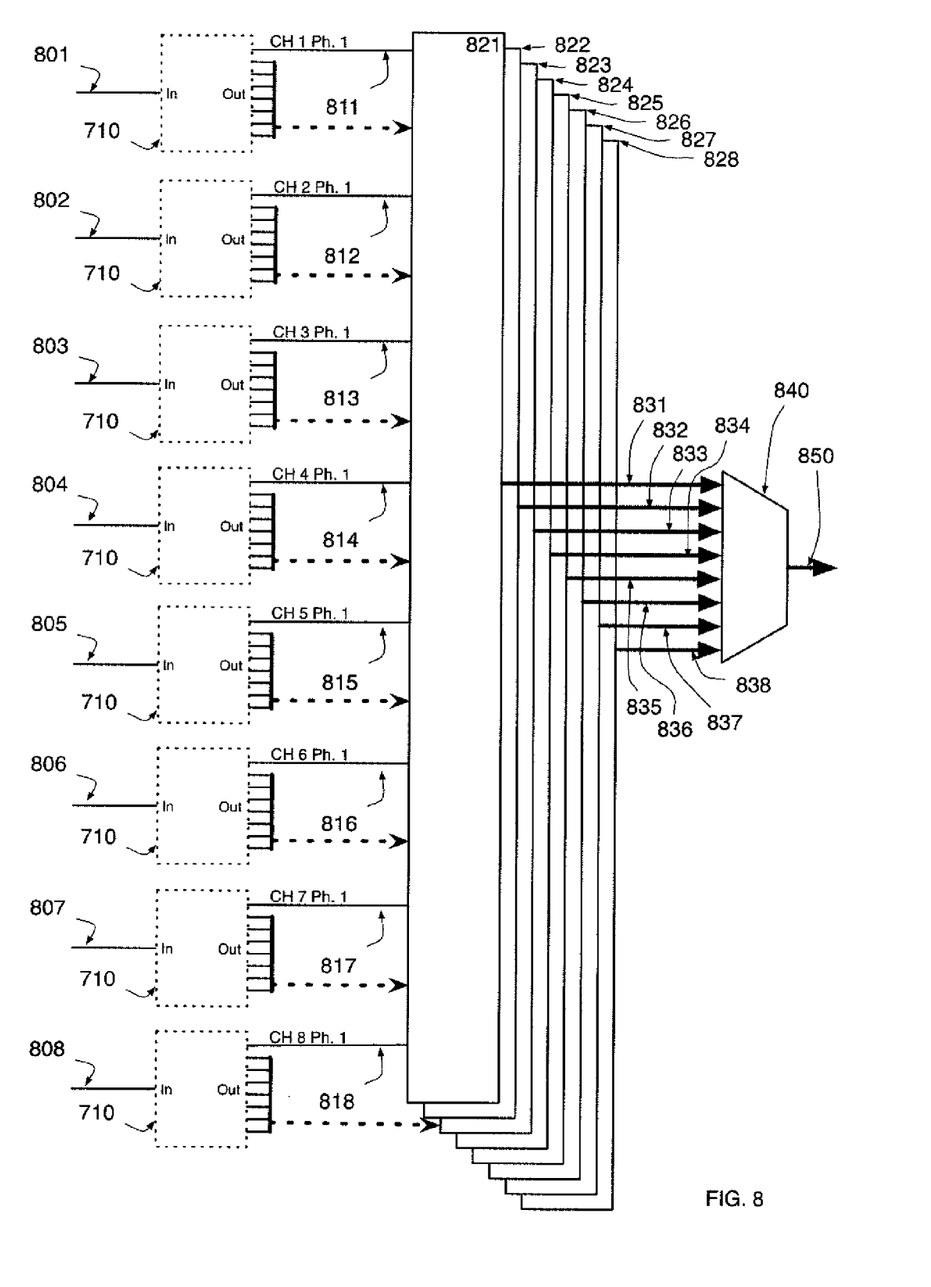
FIG. 8 is a block diagram of a vector signal code receiver extending the multiphase processing of FIG. 7 to include sorting or ranking of received symbols, in accordance with at least one embodiment of the invention.

FIG. 8 provides a block diagram incorporating an embodiment of the invention incorporating phased processing including channel ranking or sorting. Each of the example eight Receive Signal Inputs 801 through 808 comprising the vector signaling code communications link is handled by one instance of multiphase receive processing subsystem 710 as shown in FIG. 7 and previously described. Thus, the example eight outputs of each subsystem 710 correspond to the digital signal outputs of each of the example eight phases of 710 for that Receive Signal Input, for eight consecutive symbol times. Each output corresponding to the same processing phase of 710 are input to a continued phased processing element, as an example an instance of a sorting or ranking circuit. This is shown as phase 1 digital results 811 through 818 connected to sorting or ranking circuit 821. As will be readily apparent to a practitioner of the art, equivalent connections are also made of all phase 2 digital results to sorting circuit 822, phase 3 to 823, phase 4 to 824, phase 5 to 825, phase 6 to 826, phase 7 to 827, and phase 8 to 828, as indicated by the dashed lines. As with the phased processing of FIG. 7, extension to fewer or greater number of phases is readily apparent to a practitioner of the art.

The output of each sorting or ranking phase 831 through 838 are input to multiplexor 840, where results for consecutive symbol intervals are combined into composite result 850 having sorted or ranked results for every received symbol interval, corresponding to result 280 of FIG. 2B in an embodiment not utilizing the phased processing of FIG. 8.

Clock Relationships

Figure 3:
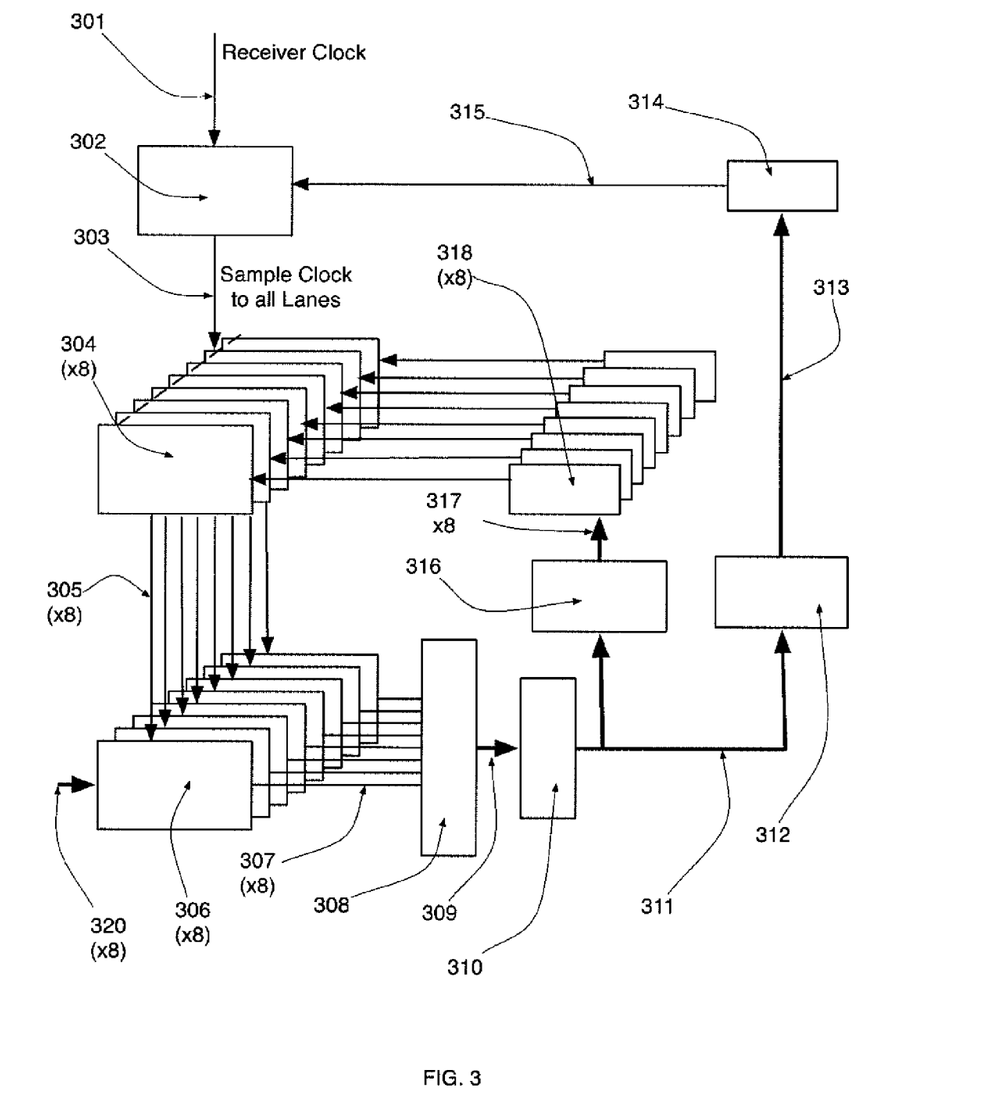
FIG. 3 is a block diagram of a receive clock control system having a master receive clock and individual phase interpolators for each channel in accordance with at least one embodiment of the invention.

A relationship between the symbol-rate master receive clock and the signal sampling interval on each channel is shown in greater detail in FIG. 3. The master receive clock 301 may be generated from the received signal using conventional circuits or methods, such as a phase-locked or delay-locked loop. For purposes of explanation, this master receive clock may be presumed to be stable and isochronous to the original transmit symbol clock rate, albeit with some phase offset. An appropriately compensating phase offset (here called CDR) is produced by a CDR Phase interpolator 302 under control of a CDR phase select register 314, producing a symbol-rate sample clock 303 representing a baseline offset for all sampling elements together. This clock is distributed to each of the Lane Align phase interpolators 304, which introduce a further per-channel offset under control of each phase select registers 318, to produce individual skew-adjusted sampling clocks 305 for each receive channel 306.

As previously described, each receive channel 306 produces a digital output signal 307 proportionate to receive channel input 320 signal level. These digital output signals 307 are compared 308 (as an example, as pulse-position-encoded signals compared by an arbiter circuit) producing ranked outputs 309 which may be recoded 310 for computational convenience into a permuted enumeration 311 for analysis by CDR phase decision system 312 and channel phase decision system 316, respectively producing CDR phase adjustments 313 and channel phase adjustments 317.

There are thus two control loops—a first loop controlling overall phase of sample clock 303, and a second loop which controls offset from sample clock 303 to each individual channel sampling clocks 305.

Example embodiments of the component circuits of such a receiver are taught in Tajalli I and Cronie V.

Impact of Selecting Sample Time

Figure 4:
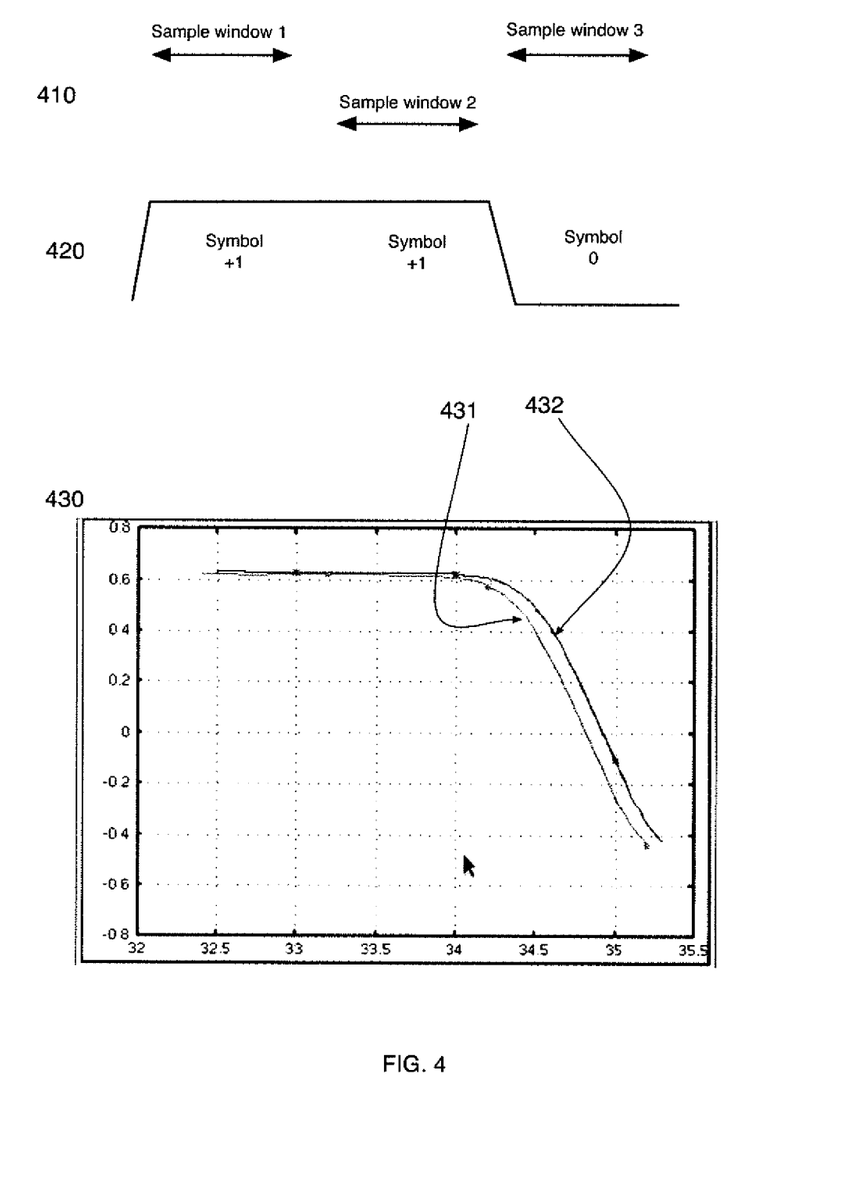
FIG. 4 illustrates the use of signal amplitude measurement to measure and adjust signal sample timing in accordance with at least one embodiment of the invention.

FIG. 4 illustrates the relationship in at least one embodiment in accordance with the invention between the time interval in which a receive channel's sample-and-hold circuit samples an input signal, and the resulting signal voltage as determined by the voltage-to-time converter. If input signals were unchanging, sample timing would have no impact. However, if a signal transitioning from, as an example, a+1 volt level to a zero volt level is sampled during the transition, an intermediate measurement between 1 and 0 will result. This effect is well known for single-circuit serial links, and is typically addressed in such circuits as part of maximizing receive "eye opening" using conventional clock recovery methods.

When codewords comprising multiple symbols are transmitted on multiple channels, this effect may cause variations in signal arrival times between different channels to appear as variations in receive signal amplitudes on those channels, if all channels are sampled simultaneously. These variations subsequently result in different sort orders obtained from the sorting decoder, potentially resulting in incorrect symbol identification. Thus, the single-link concept of "eye opening" is seen to have two distinct components in systems utilizing vector signaling codes; a per-wire component focused on producing normalized signal levels by sampling that wire in the center of its stable time, and an aggregate component dedicated to delivering correctly-formed codewords comprising symbols coherent in time, that is, originally transmitted together and equitably combined by the receiver. Operationally, this implies two levels of parameter manipulation are also used, to control adjustment of individual channel gain, equalization, and sample timing, and to manage cross-channel variations including differential gain and timing skew.

Measuring Channel Gain Characteristics

At least one embodiment in accordance with the invention does not include separate channel measurement sensors to, as examples, measure absolute signal levels on individual circuits or signal edge transitions independent of the selected sampling window. Addition of such additional measurement components would significantly impact complexity, performance, and cost of the communications system. Therefore, it is advantageous to identify solutions allowing analyses of both initial and ongoing signal characteristics using metrics already present in the existing receiver and decoder systems.

As an example, consider the operation of the sorting decoder. Its output is a ranking of inputs by amplitude which are subsequently categorized into, using the example of the 8b8w code of Cronie III, two positive values corresponding to symbols herein called "+1", four quiescent values corresponding to symbols herein called "0", and two negative values corresponding to symbols herein called "−1".

Absolute numeric values might not be available for the measured signal levels. However, analysis of the symbol categorization results over time can provide indications of differential behavior among channels. For example, if the absolute signal amplitudes of channels 1 and 2 were identical, then it follows that "+1" symbols identified as appearing simultaneously on the two channels should, on average, appear in first-to-last sorted channel results in {1, 2, . . . . } and {2, 1, . . . } orders with equal probability. Conversely, a bias of channel 1 always being ranked ahead of (in this example, more positive than) channel 2 in such measurements may indicate a differential gain imbalance between those channels. Similar arguments may be made for "−1" symbols, and for "0" symbols, addressing other adjustable characteristics such as voltage-to-time converter scale and offset voltage, rather than channel gain.

In at least one embodiment in accordance with the invention, the information available for analysis comprises the raw ranking results 280 provided by the ranking decoder 270 of FIG. 2, and the knowledge of how those ranks will be interpreted by subsequent logic, based on the specifics of the vector signaling code being used.

To distinguish steady-state and transient signal effects, triplets of ranking information obtained in three consecutive clock intervals might be analyzed rather than individual interval data. Thus, as an example, consecutive identification of ranked results that would be interpreted as [+1,+1,+1] symbols simultaneously occurring on both channel 1 and channel 2 provides an excellent opportunity to compare steady-state differential gain on those two channels, as the middle of the three samples will be relatively unaffected by transient effects such as equalization or skew.

At least one embodiment in accordance with the invention stores results obtained from the rank decoder on consecutive symbol intervals for analysis by a control processor.

For the example 8b8w code and highest to lowest ranks numbered 1 to 8, ranks 1 and 2 correspond to "+1" symbols, ranks 3 through 6 correspond to "0" symbols, and ranks 7 and 8 correspond to "−1" symbols. In a well-balanced system (uniform gain and equalization across all channels, well calibrated measurement circuits, etc.) a given wire should have equal probability of being ranked 1 or 2 in the middle sample of three consecutive "+1" symbols. Similarly, a middle sample of three consecutive "−1" symbols should have equal probability of being ranked 7 or 8, and a middle sample of three consecutive "0" symbol should have equal probability of being ranked 4 or 5, and equal probability of being ranked 3 or 6. Symbol triplets suitable for steady-state voltage adjustments such as gain and DC offset might be the triplets [−1 −1 −1], [0 0 0], and [1 1 1].

At least one embodiment in accordance with the invention encapsulates such desirable sequences as pattern-matching "rules", which are evaluated by an out-of-band control processor. Rules utilizing analysis of a signal characteristic over time (such as "equal probability of rank 1 and 2") may be called "statistical" rules, and require assessment of many comparison events and thus storage of ongoing statistical measurements. More conveniently, rules may directly compare the values seen when desirable patterns simultaneously occur on two different wires; so-called "direct comparison" rules. For direct comparison rules, all of the information necessary for analysis is contained in the rule pattern, identification of the two wires associated with the pattern, and an identifier of which wire has the more positive sorted or ranked value in the middle value of the triplet, which may be provided by a single bit of information.

It should be noted that such pattern-matching rules do not necessarily require the intentional transmission of known data patterns or sequences, as in a link start-up or "training" code pattern. At least one embodiment in accordance with the invention utilizes such training patterns to calibrate and adjust link characteristics. Known training patterns facilitate adjustment of systems where there is no a priori knowledge of channel loss, skew, or noise characteristics, as an example at system startup time. This allows gross calibration adjustments of, as an example, receive clock phase to be made without risk of data corruption. However, the described measurement and adjustment methods may be applied equally well to incremental adjustments using data patterns found to occur during normal data transmission. At least one embodiment in accordance with the invention performs incremental adjustments of link characteristics non-disruptively during normal data transmission, for purposes of continually optimizing link operation and dynamically adapting to changing signal characteristics.

Various embodiments in accordance with the invention present data to the control processor for analysis using a serial or parallel interface, FIFO data structure, shared memory, and/or message-passing interface. The data for analysis may comprise raw output results from the sorting decoder, such results converted into wire ranking form, or such results filtered or pre-processed to present only the information necessary for analysis. Data may be provided continuously, or as bursts of consecutive measurements sent periodically, and the control processor may be implemented as a dedicated logic circuit, programmed logic finite state machine, or software running on a general-purpose processor.

At least one embodiment in accordance with the invention encodes the sorting decoder ranks using the permuted enumeration shown in Table 1. Using this permutation, the most-significant bit or bits of the number identifies the symbol value represented to allow quick comparison when identifying triplets, and the least-significant bit or bits of the number shows relative rank within the same symbol value to permit two wires of the same symbol value to be quickly compared in relative rank.

TABLE 1

| Number | Rank | Symbol value |
|---|---|---|
| 111 | highest ranked signal | +1 |
| 110 |  | +1 |
| 011 |  | 0 |
| 010 |  | 0 |
| 001 |  | 0 |
| 000 |  | 0 |
| 101 |  | −1 |
| 110 | lowest ranked signal | −1 |

An embodiment using such a permuted enumeration to identify the ranking of eight wires will transmit to the control processor 8×3 bits of information per symbol interval, for sufficient consecutive symbol intervals to provide reasonable expectation that suitable simultaneously-occurring triplets may be identified within the set.

Measuring Dynamic Channel Characteristics

Additional triplet patterns may be considered which correspond to rules for analysis of dynamic channel characteristics, including line equalization, sampling clock phase, and incremental clock offset (also known as "skew compensation.")

Consider a pattern of consecutive symbols such as ["0", "+1", "0"]. In an ideal well-equalized system, the peak amplitude of the single-interval "+1" pulse would be the same as a steady-state "+1" signal on the same wire, and rise- and fall-times would be fast and without overshoot so that "0" values preceding and following the pulse would also be comparable to those seen during steady-state "0" on the same wire. Variations from this ideal may indicate under-equalization, resulting in slow rise/fall times which will be seen as lower pulse amplitude and/or higher pre- and post-pulse amplitude, or over-equalization which presents itself as overshoot or ringing which will be seen as anomalous high pulse amplitudes and/or low pre- or -post pulse levels. Triplets suitable for analog equalization adjustment are listed in Table 2.

TABLE 2

|  | #1 | #2 | #3 | #4 |
|---|---|---|---|---|
| Reference Flat lines: | [−1 −1 −1] | [0 0 0] | [+1 +1 +1] |  |
| Pulses: | [0 +1 0] | [+1 0 +1] | [0 −1 0] | [−1 0 −1] |

Similarly, asymmetries in the pre- and post-pulse values may indicate a timing window error in that channel's sample-and-hold circuit. Using the same example pattern, early sampling may cause the pre-pulse value to appear to be slightly high, and the pulse value to appear to be slightly low, as the measurement window will incorrectly include portions of the adjacent time period.

Sampling Clock Phase Measurement

At least one embodiment in accordance with the invention identifies timing window errors more directly, using symbol triplets that cover time periods in which there is a single monotonic rising or single monotonic falling signal transition on each of a pair of wires, as enumerated in Table 3 for the example of an 8b8w vector signaling code.

TABLE 3

| |
| --- |
| [+1 +1 0] |
| [+1 +1 −1] |
| [+1 0 0] |
| [+1 −1 −1] |
| [0 +1 +1] |
| [0 −1 −1] |
| [0 0 +1] |
| [0 0 −1] |
| [−1 −1 0] |
| [−1 −1 +1] |
| [−1 0 0] |
| [−1 +1 +1] |
| [+1 0 −1] |
| [−1 0 +1] |

In at least one embodiment, a master symbol-interval sample clock is generated that corresponds to the periodic reception of valid symbols across all wires. Adjustable delay elements (herein called "phase interpolators") are used to allow each individual wire's receive channel sampling time to be offset incrementally from that master clock, allowing each wire's signal to be sampled at the appropriate time for its particular propagation delay characteristics. FIG. 3 illustrates the relationship of clock, signal, and control measurement components of such a receiver at channel and symbol levels.

For the master clock phase adjustment, identified as CDR phase interpolator 302 in FIG. 3, one of the triplets in Table 3 is used on one wire, and its time-reversed compliment on another wire. Thus, a pattern of [+1+1 0] on wire 1 and a simultaneous pattern of [0+1+1] on wire 2 would be suitable for master clock adjustment. For this pattern, the lower amplitude of the center sample in the triplet indicates whether the master clock is too early or too late. If [+1+1 0] has the lower amplitude center sample, it is sampling too late (too close to the trailing 0) and the phase of the master clock should be incrementally moved earlier by reducing the CDR phase adjustment amount. Conversely, if [0+1+1] has the lower amplitude center sample, it is sampling too early (too close to the leading 0) and the phase of the master clock should be incrementally moved later by increasing the CDR phase adjustment amount. Similar reasoning may be applied to the other CDR phase interpolator adjustment triplets.

The same triplets in Table 3 can also be used to adjust the incremental delay of the individual phase interpolators associated with each wire, identified as Lane Align phase interpolators 304 in FIG. 3. In this case, identical triplet patterns are identified on both wires. Using the example of a [+1+1 0] pattern simultaneously occurring on wires 1 and 2, the wire experiencing the later relative sample will see its triplet's center sample having a lower value (closer to the trailing 0), thus should have its Lane Align phase interpolator delay nudged slightly earlier. Similar reasoning may be applied to the other Lane Align phase interpolator adjustment triplets.

The described application of the signal amplitude measurements performed during this triplet analysis to discern errors in sampling time is graphically illustrated in FIG. 4, which illustrates reception of a [+1, +1, 0] symbol triplet on two wires. As shown in 420, a transmitted signal representing a +1 symbol is received (approximately between times 32.5 and 33.5 on the X axis of graph 430) followed by a second +1 symbol (approximately 33.5 to 34.5) and a 0 symbol (34.5 to 35.5). The sampling windows used to capture the signal levels representing the symbols are shown in 410. If the propagation delay of the first of the two wires is slightly less than that of the second wire (that is, the sample window is slightly late on that wire relative to its actual signal transitions) the values measured during the sample intervals will be as shown in graph 430, where measured first wire value 431 is slightly lower (i.e., it incorporates some portion of the trailing 0 symbol value) relative to measured second wire value 432.

Figure 5:
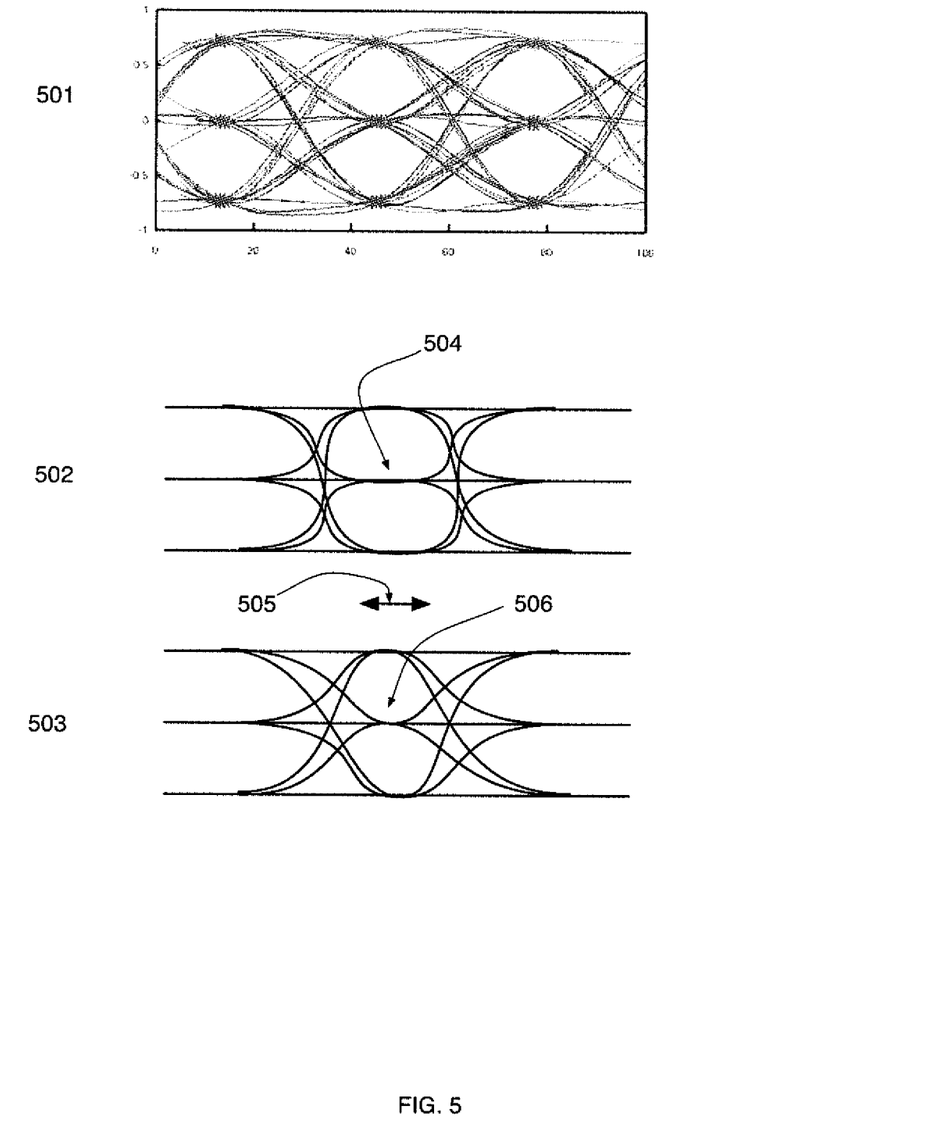
FIG. 5 shows the effect of receive channel conditions using a receive channel eye chart, in accordance with at least one embodiment of the invention.

The sensitivity of both master clock and incremental delay measurements are heightened under slightly degraded signal conditions. FIG. 5 shows a typical eye diagram for a single receive channel 501. Under optimum signal characteristics, the "eye" will be fully open as illustrated at 502 with the fast signal rise and fall times producing a fairly flat bottom 504. Under these conditions, sampling window timing 505 can move slightly earlier or later than its optimum point without significant change in detected signal level. When signal conditions are degraded or rise and fall times are slower as illustrated in 503, a slight timing offset of the sampling window 505 quickly intersects the rising or falling edge of a signal transition 506, introducing a change in the measured value and thus signaling an error.

This reduction in loop sensitivity under optimum signal characteristics is similar to the "dead zone" around the set value that is often seen in traditional closed-loop feedback systems. At least one embodiment in accordance with the invention intentionally reduces high-frequency compensation under good signal conditions to increase the slope of the eye bottom 504, thus reducing the time adjustment dead zone without impacting overall error rate.

Figure 6:
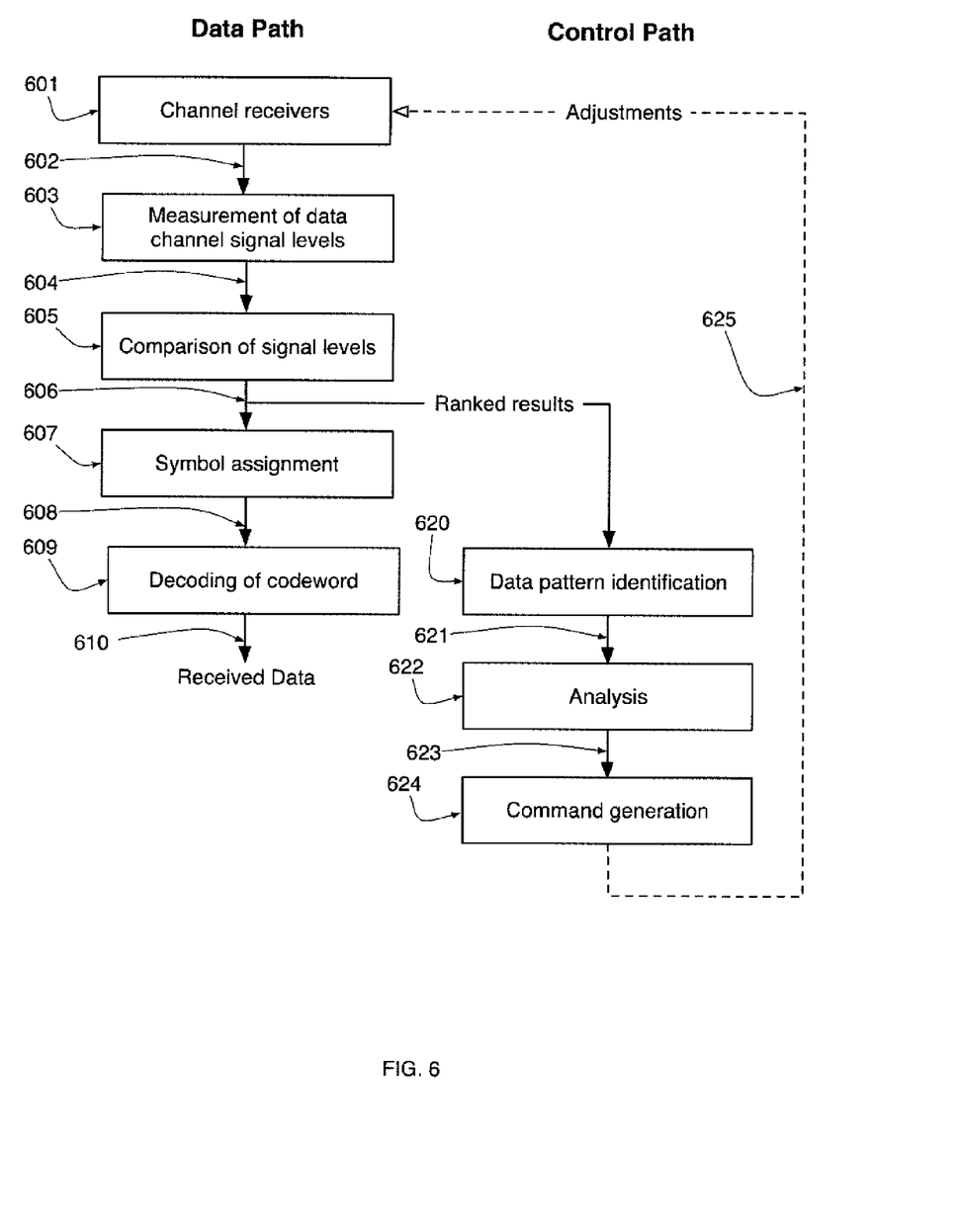
FIG. 6 is a block diagram illustrating the measurement and control process in accordance with at least one embodiment of the invention.

The relationship between the existing elements of a vector signaling code receive data path and the measurement and control process in accordance with at least one embodiment of the invention is shown in FIG. 6. The existing data path incorporates channel receivers 601 as detailed as 210 in FIG. 2, which accept, amplify, and equalize channel input signals to produce outputs 602. These are measured 603 and compared 604 to produce ranked results 606. The data path operations continue by assigning 607 vector signaling code symbol values to the various channels to produce a codeword 608, which may then be decoded 609 to produce the received data output 610.

As previously described, the control loop that manages this receive operation re-uses many of the existing data path functions, rather than requiring separate measurement devices. The ranked results 606 are examined to identify 620 data patterns 621, such as the consecutive triplets of results of the various sets of triples described herein. These data patterns are analyzed 622 to determine if a channel secondary characteristic such as gain, offset, equalization, or sample timing requires adjustment 623. If so, commands are generated 624 to initiate the adjustments 625 to the data path receiver.

Extended Skew Compensation

As previously described, differential arrival times resulting from up to one symbol-interval of differential propagation delay may be compensated by selective adjustment of the Lane Adjustment phase interpolators, allowing slightly different sampling times to be applied for each lane or channel comprising the vector signaling code communications link.

To provide a concrete example, assume symbols are transmitted over eight signal lines of a vector signaling code link at a rate of 4 Gigasymbols per second, corresponding to symbol arrival intervals of 250 picoseconds. If line 1 has the smallest propagation delay and line 8 the largest, with an overall difference of 200 picoseconds, the differing symbol arrival times can be corrected by a 200 picosecond advance of the sampling time for line 1, relative to line 8.

Using the same example values with an embodiment having eight processing phases of channel processing including a ranking or sorting system as shown in FIG. 7 and FIG. 8, symbol-rate receive clock 780 measures 250 picosecond intervals (the symbol arrival rate) while any one instance of sample-and-hold circuit 750 obtains a new value every 2000 picoseconds (i.e., one eighth the symbol arrival rate.) Thus, the circuitry of each processing phase has as much as 2000 picoseconds to measure, compare, and rank the symbols of the multiple channels, versus the 250 picoseconds available to a single-phase embodiment.

In at least one embodiment, the total processing time available to a processing phase exceeds the required processing time for that phase. As an example, assume that processing elements 765 of FIG. 7 and processing elements 821-828 of FIG. 8 together constitute a measuring and ranking subsystem with a maximum result completion time of 1200 picoseconds in any single phase. Thus, a valid result can be obtained from a computational phase even if its computation start time were delayed by as much as 800 picoseconds (the difference between the required processing time and the available processing time in a processing phase.) Conversely, assume the example computation is started when the most delayed channel input becomes available, line 8 in this example. Relative to line 8, the sampling time of earlier-arriving channels may be advanced by as much as 800 picoseconds while still providing timely results to the computation.

This example implies a mechanism allowing a greater range of skew compensation in at least one embodiment. If Phase Selector 790 of FIG. 7 is offset on early-arriving channels, (the phase selection counter for those channels having been incremented by one or more counts relative to the counter of the most delayed channel, as an example) the sampling time on those channels may be advanced in increments of the symbol arrival time relative to the most delayed channel, up to the excess processing time available for each phase. Residual skew amounts may then be compensated using Lane Adjustment phase interpolators. One familiar with the art will recognize after reading this disclosure that a number of equivalent methods exist to provide the described offset between channel phases, including reinitialization of phase selectors, adding/skipping counts, etc. Physical or logical rerouting of digital result signals from different channel phases to each ranking or sorting circuit provides an equivalent result, albeit at significantly greater implementation complexity.

In some embodiments, combination adjustments of phase interpolators and phase selectors may be performed so as to provide continuous ranges of skew compensation without impact on an ongoing data stream. All numeric values provided herein as examples are solely for purposes of description, and do not constitute a limitation.

The examples presented herein illustrate the use of vector signaling codes for point-to-point wire communications. However, this should not been seen in any way as limiting the scope of the described invention. The methods disclosed in this application are equally applicable to other communication media including optical and wireless communications. Thus, descriptive terms such as "voltage" or "signal level" should be considered to include equivalents in other measurement systems, such as "optical intensity", "RF modulation", etc. Similarly, examples may reference a particular vector signaling code, number of channels, or codeword size for purposes of description without implying a limitation. Any described algorithm, method, or process may be performed by a hardware circuit, programmed or hardwired finite state machine, or by software executing on a control processor.

As used herein, the term "physical signal" includes any suitable behavior and/or attribute of a physical phenomenon capable of conveying information. Physical signals may be tangible, measurable, and non-transitory.

We claim:

1. In a device that communicates over a communications interface having a plurality of channels with communications according to a vector signaling code, a method of adjusting and controlling the communications interface comprising:
measuring a signal level of each of a measured plurality of the channels;
comparing signal levels between a first set of pairs of the measured plurality of the channels to form a first set of comparisons;
comparing signal levels between a second set of pairs of the measured plurality of the channels, wherein the second set is not identical to the first set, to form a second set of comparisons;
reading data that maps data patterns of the first set of comparisons and the second set of comparisons to corresponding identified secondary communication characteristics, such that a data pattern is deemed likely to be sensitive to its corresponding identified secondary communication characteristic;
identifying at least one data pattern and its corresponding identified secondary communication characteristic;
determining a metric for the identified secondary communications characteristic using signal levels associated with its corresponding data pattern; and
outputting one or more instructions that, when received, would cause the communications interface to adjust the identified secondary communications characteristic.

2. The method of claim 1, wherein the secondary communications characteristics comprise one or more of sampling time, equalization, gain, and offset voltage.

3. The method of claim 1, wherein the data patterns are patterns of consecutively received symbols of the vector signaling code.

4. The method of claim 3, wherein reading data that maps data patterns comprises reading mapped data patterns that occur in normal data transmission.

5. The method of claim 3, wherein reading data that maps data patterns comprises reading mapped data patterns that are test data patterns that do not occur in normal data transmission.

6. The method of claim 1, wherein comparing signal levels comprises sorting, ranking, or both.

7. The method of claim 1, wherein the secondary communication characteristic is a sampling time and adjusting the secondary communication characteristic is adjusting the sampling time to compensate for differential propagation delay among the plurality of channels.

8. In a device that communicates over a communications interface having a plurality of channels with communications according to a vector signaling code, a method of compensation for differential propagation delay among the plurality of channels, comprising:
sampling a signal level of each of a sampled plurality of the channels;
assigning sample values to each of the sampled signal levels;
comparing the assigned sample values to a vector signaling codeword;

determining arrival times of simultaneously transmitted symbols of the vector signaling codeword based on results of the comparing; and outputting a decoded result of the vector signaling codeword.

9. The method of claim 8, wherein consecutive instances of at least one of the sampling, assigning, and comparing steps are assigned to different instances of multiple, substantially parallel processing operations.

10. The method of claim 9, wherein assigning to different instances introduces processing delay between the sampling and the comparing of at least one assigned sample value.

11. The method of claim 10, wherein the introduced processing delay is incorporated as one component of arrival times determining.

12. A system for adjustment and control of a communications interface comprising multiple data connections communicating using a vector signaling code, the system comprising:

a measurement circuit that compares a received signal level of the data connections to obtain a full or partial ranking of results;

an assignment circuit that designates ranked results as corresponding with particular vector signaling code symbols;

data storage including identification of at least one pattern of consecutively received symbols on at least one data connection;

logic for analysis of the ranked results associated with a pattern to determine communications interface elements requiring adjustment; and logic for adjustment of the communications interface elements.

13. The system of claim 12, wherein the adjustments are at least one of data connection gain, data connection offset voltage, data connection equalization, and data connection sample timing.

14. The system of claim 12, wherein the identified data pattern is a data pattern that occurs in normal data transmission.

15. The system of claim 12, wherein the identified data pattern is a data pattern that is a test data pattern that does not occur in normal data transmission.

16. The system of claim 12, wherein the adjustment includes adjusting the sampling time to compensate for differential propagation delay among the multiple data connections.

* * * * *